United States Patent
Alten

(10) Patent No.: US 9,276,906 B2
(45) Date of Patent: *Mar. 1, 2016

(54) SYSTEMS AND METHODS FOR A SELF-DEFENDING WIRELESS COMPUTER NETWORK

(71) Applicant: Alex I. Alten, Pleasanton, CA (US)

(72) Inventor: Alex I. Alten, Pleasanton, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/262,648

(22) Filed: Apr. 25, 2014

(65) Prior Publication Data

US 2014/0237583 A1    Aug. 21, 2014

Related U.S. Application Data

(63) Continuation of application No. 11/248,848, filed on Oct. 12, 2005, now Pat. No. 8,752,129.

(51) Int. Cl.
  *H04L 29/06* (2006.01)
  *H04L 29/12* (2006.01)

(52) U.S. Cl.
  CPC .......... *H04L 63/0281* (2013.01); *H04L 61/103* (2013.01); *H04L 61/2015* (2013.01); *H04L 63/145* (2013.01); *H04L 63/1408* (2013.01)

(58) Field of Classification Search
  CPC .................................................. H04L 63/0281
  See application file for complete search history.

(56) References Cited

U.S. PATENT DOCUMENTS

| | | | |
|---|---|---|---|
| 6,262,988 B1* | 7/2001 | Vig | 370/401 |
| 6,418,129 B1* | 7/2002 | Fingerhut | 370/328 |
| 6,643,274 B2* | 11/2003 | D'Annunzio | 370/316 |
| 6,971,005 B1* | 11/2005 | Henry et al. | 713/155 |
| 7,120,438 B2* | 10/2006 | Omar et al. | 455/435.1 |
| 7,356,032 B1* | 4/2008 | Sumorok | H04L 29/12028 370/392 |
| 7,414,996 B2* | 8/2008 | Fan | 370/338 |
| 2004/0100934 A1* | 5/2004 | Kachi | H04L 29/12028 370/338 |
| 2004/0196808 A1* | 10/2004 | Chaskar et al. | H04W 36/0011 370/331 |
| 2004/0240474 A1* | 12/2004 | Fan | 370/475 |
| 2005/0108431 A1* | 5/2005 | Park | H04L 29/12311 709/245 |
| 2006/0002324 A1* | 1/2006 | Babbar et al. | 370/325 |
| 2006/0062187 A1* | 3/2006 | Rune | 370/338 |

OTHER PUBLICATIONS

Bargh etal., "Fast Authentication Methods for Handovers between IEEE 802.11 Wireless LANs" Oct. 1, 2004. WMASH'04.*

* cited by examiner

*Primary Examiner* — Mohammad L Rahman
(74) *Attorney, Agent, or Firm* — James M. Wu; JW Law Group

(57) ABSTRACT

In one embodiment, the methods and apparatuses to assign a routing address to a wireless computer that is in a different logical network from the routing addresses of other wireless computers within the same physical wireless network; and to prevent a wireless computer from learning the routing address of another wireless computer within the same physical wireless network.

17 Claims, 2 Drawing Sheets

SYSTEMS AND METHODS FOR A SELF-DEFENDING WIRELESS COMPUTER NETWORK

CROSS REFERENCE TO RELATED APPLICATIONS

The present application is a continuation of U.S. patent application Ser. No. 11/248,848 filed on Oct. 12, 2005, entitled "Systems and Methods for a Self-Defending Computer Network" listing the same inventor, which claims the benefit of U.S. Provisional Patent Application No. 60/617,979 filed on Oct. 12, 2004, entitled "Systems and Methods for a Self-Defending Computer Network" listing the same inventor, the disclosures of which are hereby incorporated by reference.

FIELD

This invention is related to a self defending computer network in general, and in particular a self-defending wireless computer network.

BACKGROUND

There are a variety of ways that a computer can be attacked to compromise the computer's functionality. For example, viruses and worms are common attacks that are utilized to hinder the functionality of a computer. To counterbalance these attacks, there have been a proliferation in computer anti-virus software applications that attempt to identify the virus or worm and neutralize the threat of the virus or worm spreading from a local computer to another computer.

SUMMARY

In one embodiment, the methods and apparatuses to assign a routing address to a wireless computer that is in a different logical network from the routing addresses of other wireless computers within the same physical wireless network; and to prevent a wireless computer from learning the routing address of another wireless computer within the same physical wireless network.

DETAILED DESCRIPTION OF THE INVENTION

Specific reference is made in detail to the embodiments of the invention, examples of which are illustrated in the accompanying drawings and following descriptions. While the invention is described in conjunction with the embodiments, it will be understood that the embodiments are not intended to limit the scope of the invention. The various embodiments are intended to illustrate the invention in different applications. Further, specific details are set forth in the embodiments for exemplary purposes and are not intended to limit the scope of the invention. In other instances, well-known methods, procedures, and components have not been described in detail as not to unnecessarily obscure aspects of the invention.

Figure 1:
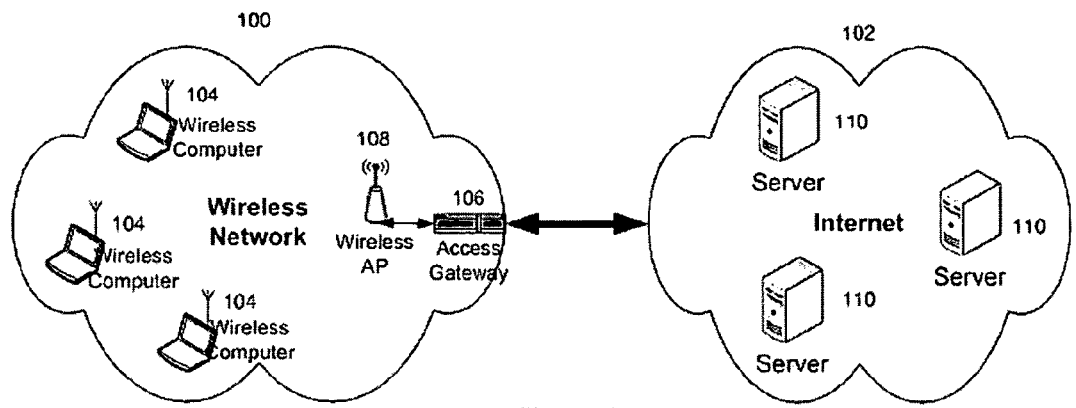
FIG. 1 depicts a diagram illustrating one embodiment of a Wireless Network with Wireless Computers, an Access Gateway and Internet Servers.

Referring to FIG. 1, this illustrates wireless computer network (100), such as an IEEE 802.11 based one, with a connection to the Internet (102) via an Access Gateway (106). In one embodiment, the wireless computers (104) are mobile and may enter and leave the wireless computer network at anytime. They also may access various Servers (110) out on the Internet (102) or on a corporate wired Intranet.

Figure 2:
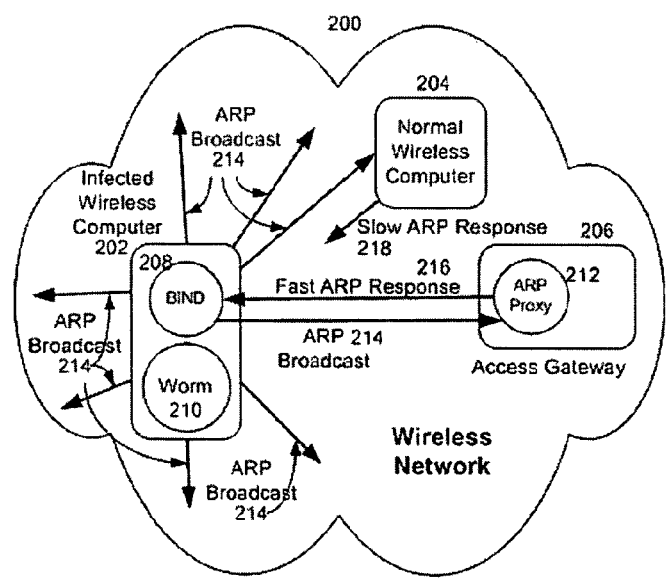
FIG. 2 depicts a diagram illustrating one embodiment of the Address Resolution Protocol (ARP) communications between Wireless Computers and the ARP Proxy software module on the Access Gateway.

Referring to FIG. 2, this illustrates a Wireless Network (200) with a Wireless Computer A (202) that has been infected with a network aware virus (210), or Internet worm, that is actively trying to find another Wireless Computer (204) to infect. In one embodiment, the worm or virus (210) instructs the Wireless Computer A's BIND (ARP Client) software (208) to issue a series of ARP broadcasts (214) to resolve addresses within a network that are assigned to the Wireless Network (200). In one embodiment, these series of addresses are from the lowest to highest host address possible with an Internet Class address. For example the network address 84.55.0.0 has 16 bits used for host addresses, which range from 84.55.0.1 to 84.55.255.254, and has more than 64,000 addresses.

In one embodiment, the Access Gateway (206) has a high-performance ARP Proxy (212) that can respond quicker than Wireless Computer B's ARP response packet (218). The ARP Proxy issues a fast ARP response binding the Access Gateway's own MAC address with the IP address the worm is seeking. Thus, the Wireless Computer A's TCP/IP stack never learns Wireless Computers B's MAC address. The Access Gateway (206) is robust in the face of a subsequent attack by the worm or virus.

Figure 3:
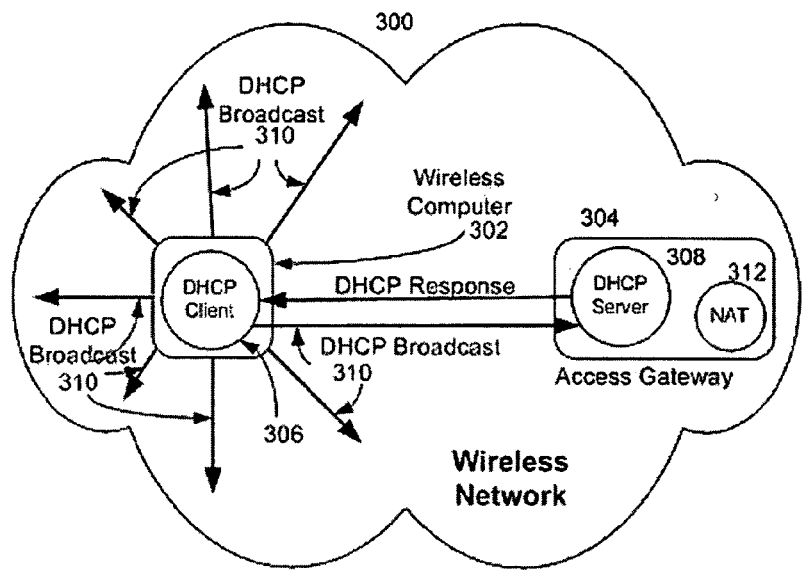
FIG. 3 depicts a diagram illustrating one embodiment of the Dynamic Host Control Protocol (DHCP) communications between a Wireless Computer and a 10 DHCP Server software module on the Access Gateway.

Referring to FIG. 3, this illustrates the Wireless Network (300) with a Wireless Computer (302) that has either just roamed into the network or has been restarted. The DHCP Client (306) within the Wireless Computer (302) periodically transmits a DHCP broadcast packet (310) requesting it's own IP address and the IP address of a gateway. The Access Gateway (304) contains a DHCP Server (308) that will respond with a DHCP response packet containing the new IP address of the Wireless Computer (302) and the Access Gateway's address for a routing gateway. The new IP address is put into a random network or subnet that doesn't already have an address assigned to another Wireless Computer. NAT software (312) running on the Access Gateway (304) will need to handle these addresses appropriately if IP packets must route outside of the Wireless Network (300). If the Wireless Computer (302) is infected with a worm, the Wireless Computer (302) is isolated from other Wireless Computers by virtue of the fact it is in it's own Internet network (or subnet). An attempt to contact an address outside of the range of addresses assigned to the network address will cause packets to be sent to the Access Gateway (304) where appropriate action can be taken to prevent the virus from spreading.

Figure 4:
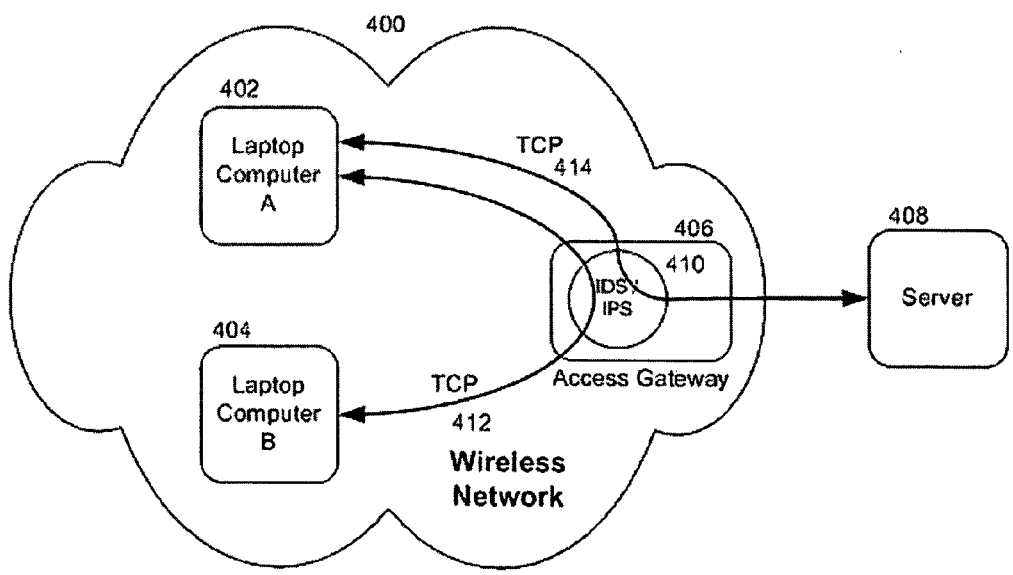
FIG. 4 depicts a diagram illustrating one embodiment of the Transmission Control Protocol (TCP) communications between Wireless Computers, between a Wireless Computer and an Internet Server.

Referring to FIG. 4, this illustrates the Wireless Network (400) with a Wireless Computer A (402) communicating via TCP (412) to Wireless Computer B (404) via the Access Gateway (406) and it's IDS/IPS software (410). Wireless Computer A can also communicate via TCP (414) through the Access Gateway and via it's IDS/IPS module to an external Server (408).

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for providing network communication between a plurality of network devices in a network via wireless communication protocols, the network coupling the plurality of network devices to at least one access gateway for transmitting information, comprising;
    transmitting a request message from a first wireless computer to a second wireless computer and an access gateway ("AG") inquiring an Internet Protocol ("IP") address of the second wireless computer within a wireless network;
    issuing a fast response message containing an AG IP address from the AG for handling subsequent network communication relating to the first wireless computer; wherein transmitting the response message includes assigning a unique network identification to the first wireless computer and screening communication from the first wireless computer by the AG for preventing computer virus initiated from the first wireless computer from spreading; and
    facilitating the fast response message to reach the first wireless computer before a response message sent from the second wireless computer.

2. The method of claim 1, further comprising receiving the request message by the AG situated in the wireless network and activating a high-performance response module for responding to the request message.

3. The method of claim 2, wherein receiving the request message by the AG further includes initiating a high-performance ARP proxy to provide a quicker response to the request message than other wireless computers within the wireless network.

4. The method of claim 1, wherein transmitting a request message from a first wireless computer to an AG includes issuing a series of address resolution protocol ("ARP") broadcasts to identify address of a second wireless computer within the wireless network.

5. The method of claim 1, wherein transmitting a request message from a first wireless computer to an AG includes seeking a second IP address associated to a second wireless computer within the wireless network.

6. The method of claim 1, further comprising ignoring a second response message from the second wireless computer by the first wireless computer after receipt of the response message from the AG.

7. The method of claim 1, further comprising assigning the AG with highest host address within an Internet Class address.

8. The method of claim 1, further comprising providing network service by the AG to the first wireless for communicating with other wireless computers after receipt of the response message from the AG.

9. A communications network, comprising:
    a first wireless computer configured to communicate through a wireless network;
    a second wireless computer configured to communicate through the wireless network; and
    an access gateway ("AG") configured to communicate with the first wireless computer and the second wireless computer and configured to include a high-performance proxy able to provide a quick response for address binding, wherein the quick response is configured to reach its target before other responses for address binding, wherein the AG is able to prevent the first wireless computer from communicating directly with the second wireless computer to prevent spreading of computer virus between the first wireless computer and the second wireless computer.

10. The network of claim 9, wherein the AG is able to prevent the first wireless computer from communicating directly with the second wireless computer by preventing the first wireless computer from learning an address of the second computer.

11. The network of claim 9,
    wherein the first wireless computer is a Dynamic Host Control Protocol ("DHCP") client;
    wherein the access gateway is a DHCP server; and
    wherein the first wireless computer broadcasts a DHCP message with an IP address request.

12. The network of claim 11,
    wherein the AG transmits a DHCP message with an IP address lease acknowledgement response; and
    wherein no other wireless computer will be assigned the same IP address during the IP address lease lifetime or before the wireless client releases the assigned IP address.

13. The network of claim 12, wherein the response message contains the network identification based on a random value.

14. The network of claim 12, wherein the response message contains a Class A IP address from 1.0.0.0 to 127.255.255.255; and wherein the network identification is unique with 128 possible values between 1 and 127.

15. The network of claim 12, wherein the response message contains a Class B IP address from 128.0.0.0 to 191.255.255.255; and wherein the network identification is a unique number of 16,384 having a range of values between 128.0 and 191.255.

16. The network of claim 12, wherein the response message contains a Class C IP address from 192.0.0.0 to 223.255.255.255; and wherein the network identification is unique a number of 2,097,152 having a range of values between 192.0.0 and 191.255.

17. The network of claim 12, wherein the response message contains IP address from 84.55.0.1 to 84.55.255.254; and wherein the network identification is unique with 64,000 possible values.

* * * * *